Dec. 12, 1961           J. L. ELAM           3,012,325
DEVICE FOR ALIGNING AUTOMOTIVE SERVICING APPARATUS
Filed Feb. 20, 1957           2 Sheets-Sheet 1
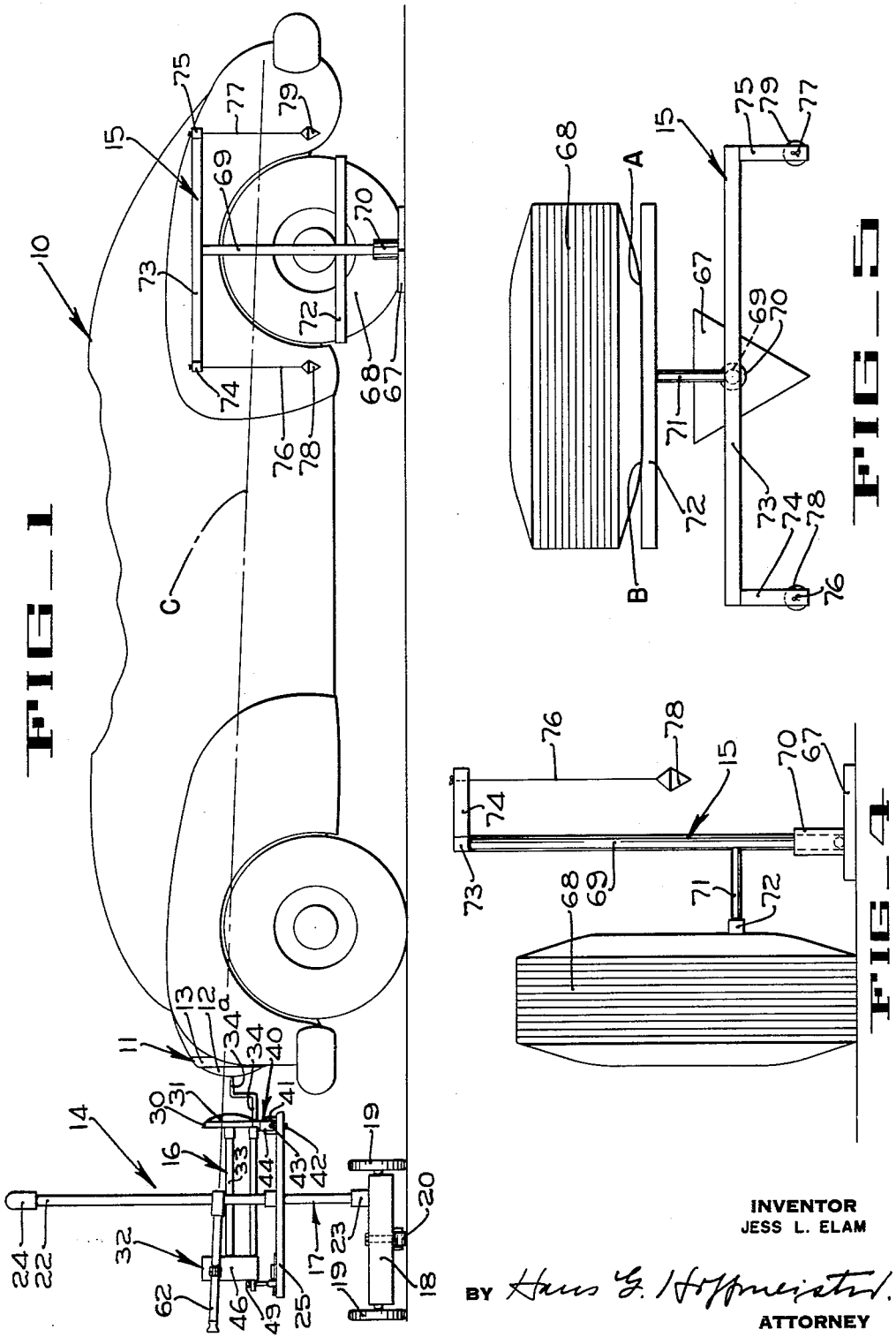
INVENTOR
JESS L. ELAM
BY Hans G. Hoffmeister
ATTORNEY Dec. 12, 1961  J. L. ELAM  3,012,325
DEVICE FOR ALIGNING AUTOMOTIVE SERVICING APPARATUS
Filed Feb. 20, 1957  2 Sheets-Sheet 2
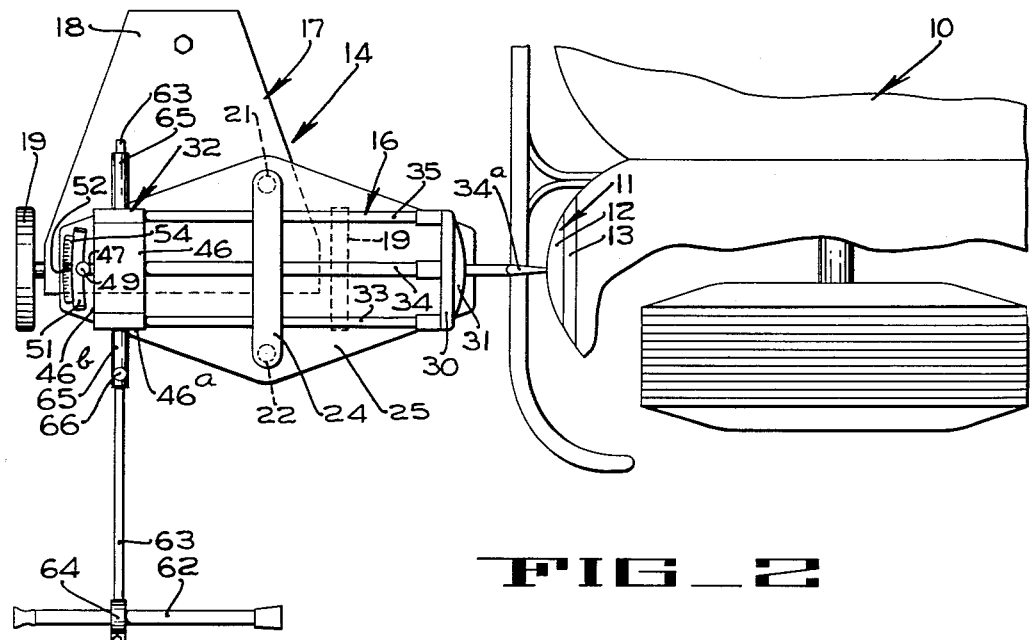
FIG_2
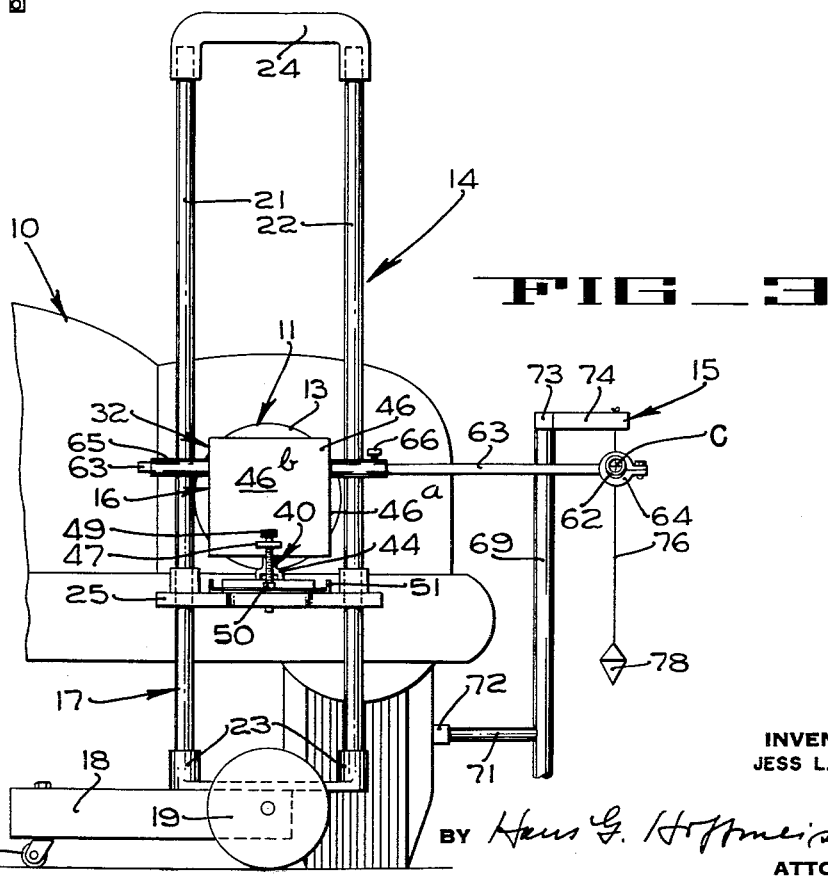
FIG_3
INVENTOR
JESS L. ELAM
BY Hans G. Hoffmeister
ATTORNEY

United States Patent Office 3,012,325
Patented Dec. 12, 1961

3,012,325
DEVICE FOR ALIGNING AUTOMOTIVE SERVICING APPARATUS
Jess L. Elam, Rock Island, Ill., assignor to FMC Corporation, a corporation of Delaware
Filed Feb. 20, 1957, Ser. No. 641,375
8 Claims. (Cl. 33—46)

The present invention appertains to automotive servicing apparatus, and more particularly to a device for aligning automotive servicing apparatus parallel to the longitudinal center line of a vehicle.

Heretofore, it has been the practice to position automotive servicing apparatus, such as headlamp testers, parallel to the longitudinal center line of the vehicle by utilizing the body lines on the vehicle, such as the center partition lines of the front and rear windows or the center line indication on the hood. However, the present trend is to manufacture vehicles without body lines that can readily be used as reference points.

Accordingly, an object of the present invention is to provide a device which will enable an operator to align an automotive servicing apparatus parallel to the longitudinal center line of a vehicle with facility.

Another object is to provide a device that enables automotive servicing apparatus to be positioned parallel to the longitudinal center line of a vehicle without adjusting the position of the vehicle.

Another object is to provide a device which enables an operator to align the optical center line of a headlamp tester parallel to the longitudinal center line of a vehicle without referring to the body lines on the vehicle.

Other objects and advantages of the present invention will become apparent from the following description and drawings in which:

FIG. 1 is a side elevation of the automotive servicing apparatus of the present invention and illustrated in position for testing a headlamp of an automobile.

FIG. 2 is an enlarged plan of the headlamp tester of FIG. 1 showing the position of the tester during the adjusting of a vehicle headlamp.

FIG. 3 is an enlarged fragmentary front elevation of the headlamp tester of FIG. 1.

FIG. 4 is an enlarged front elevation of the aiming device of the present invention illustrating the position of the device relative to the rear tire of the automobile which is also shown in elevation.

FIG. 5 is a plan of the aiming device shown in FIG. 4.

The aiming device of the present invention may be used with many different types of automotive servicing equipment, which require alignment with the longitudinal center line of a vehicle. Although the illustrated embodiment of the present invention is a headlamp testing apparatus, the invention is not to be restricted to a headlamp testing apparatus, but may encompass other types of automotive servicing equipment.

In FIG. 1, a vehicle 10 is illustrated which has a pair of headlamps 11 (one only being shown). Each headlamp includes a lens 12 disposed in a housing 13, which is universally mounted on the vehicle in a conventional manner for horizontal and vertical adjusting movement.

The headlamp testing apparatus enables an operator to adjust a headlamp to a position wherein the beam is projected in a direction prescribed for public safety on the highway, and comprises a headlamp tester 14 (FIGS. 1 and 2) positioned adjacent the forward end of the vehicle facing the headlamp to be tested, and an aiming device 15 (FIGS. 1 and 5) positioned adjacent the rear wheel which is located on the same side of the vehicle as the headlamp to be tested.

The tester 14 comprises a light intensity indicating unit 16 that is mounted on a portable support stand 17 (FIG. 3) which includes a generally triangular base 18 supported by wheels 19 and a caster 20. Extending vertically upward from the base 18 are two parallel rods 21 and 22, which are rigidly secured at the lower ends thereof to the base 18 by means of a bracket 23. The upper ends of the rods 21 and 22 are interconnected by a yoke 24. For supporting the light intensity indicating unit 16 at different heights above the base 18 to accommodate the different heights of headlamps on various makes of automobiles, a platform 25 (FIG. 3) is provided, which is secured for vertical adjustment on the rods 21 and 22 by suitable clamps, not shown.

The light intensity indicating unit 16 comprises a frame 30 (FIG. 2) which carries a lens 31 for converging rays of light emitted by the headlamp being tested, and directing the rays into a photometer 32 that is held in fixed spaced relation to the lens 31 by three parallel rods 33, 34 and 35. Each of the rods has its opposite ends secured in the frame 30 and in the housing of the photometer 32, respectively, and the rod 34 has an upwardly offset portion 34a parallel to the rod 34. Thus, the photometer 32, the rods 33, 34 and 35, and the lens assembly form a rigid unit and the optical center line of the unit is parallel to the rods 33, 34 and 35.

This unit is mounted on the platform 25 for adjustment in both horizontal and vertical directions by means of a universal joint 40 (FIG. 1) which is disposed beneath the lens frame 30. The joint 40 includes a member 41 that rests on the platform 25 and has a pin 42 rotatably disposed in an aperture, not shown, in the platform. A pin 43, which extends through the member 41, supports a forked mounting member 44 that is integrally formed on the lower end of the lens frame 30.

The photometer 32 has a housing 46 (FIG. 2) with a side wall 46a parallel to the rods 33, 34 and 35 and a front wall 46b (FIG. 3) from which a generally horizontal ear 47 projects. The ear 47 has a threaded opening adapted to receive in threaded engagement a suitable vertical adjustment screw 49 (FIGS. 1 and 3), which extends downwardly into a socket 50 in an elongated plate 51 that carries a pointer 52 (FIG. 2) on its outer edge. The pointer 52 projects outwardly from the plate 51 over a horizontal calibrated scale 54 fixedly mounted on the platform 25. A vertical calibrated scale, not shown, may also be provided, which can be mounted vertically on the platform 25 for cooperation with a pointer movable with the unit 16. Rotation of the adjustment screw 49 causes vertical pivoting movement of the photometer frame, and lateral adjustment of the plate 51 effects lateral pivoting of the frame about pin 42.

In adjusting vehicle headlamps, the optical center line of the intensity indicating unit 16 must be initially positioned parallel to the longitudinal center line of the vehicle. In order to make this adjustment a sighting device, such as telescope 62 (FIGS. 2 and 3) is provided on the tester. The telescope 62 is rigidly secured normal to one end of a support rod 63 by a collar 64, and the rod 63 is slidably mounted at its other end within a tube 65. The rod 63 is maintained in a fixed position relative to the tube 65 by a screw 66. Tube 65 is rigidly secured, as by welding, to the wall 46a of the housing of the photometer 32 so that the tube 65 is perpendicular to the wall 46a and to the parallel rods 33, 34 and 35. Thus, the telescope 62 is maintained parallel to the optical center line of the light intensity indicating unit 16.

For establishing a line of sight for the telescope 62 that is parallel to the longitudinal center line of the vehicle 10 without the aid of reference body lines on the vehicle 10, the aiming device 15 (FIGS. 4 and 5) is positioned adjacent the rear tire of the vehicle on the same side of the vehicle 10 as the headlamp to be tested. Since the rear axle is perpendicular to the longitudinal center line of the vehicle, the outer scuff rib of the tire is parallel to the longitudinal center line of the vehicle.

The aiming device 15 (FIGS. 1, 4 and 5) comprises a triangular base 67 that is placed on a floor adjacent the rear tire 68. A suitable vertical post 69 is mounted on the base 67 by a universal joint member 70. Fixedly secured near the lower end of the post 69 is a laterally projected support member 71, which has rigidly attached thereto a horizontal contact arm 72. The contact arm 72 is positioned at a convenient height above the base member 67 and is of a suitable length so as to contact the points A and B (FIG. 5) on the scuff rib of the sidewall of tire 68. Thus, the contact arm 72, by engaging points A and B, is parallel with the longitudinal center line of the vehicle and also defines a vertical plane parallel to the longitudinal center line of the vehicle, since a vertical plane passing through the outermost points of the scuff rib is parallel to the center line of the vehicle.

At the upper portion of the vertical post 69 is mounted a rigid horizontal member or cross bar 73, which is parallel to the contact arm 72 and has attached at the extremities thereof laterally projected plumb line support arms 74 and 75. Suspended respectively from the arms 74 and 75 by strings 76 and 77, or any suitable lines, are a pair of gravity-responsive members such as plumb bobs 78 and 79. The strings 76 and 77 are suspended from the arms 74 and 75, respectively, at equal lateral distances from the cross bar 73, and hence, are disposed in a plane parallel to the vertical planes defined by the cross bar 73 and the contact arm 72. In this manner, a line of sight C (FIGS. 1 and 3), which is determined by the alignment of strings 76 and 77, is established for an operator sighting through the telescope 62, and this line of sight provides a reference line parallel to the longitudinal center line of the vehicle.

In the operation of the headlamp testing apparatus, the aiming device 15 is positioned adjacent the rear tire 68 and the contact arm 72 is placed in firm engagement with the tire 68 so as to contact the points A and B. Hence, the strings 76 and 77 define a vertical plane parallel to the longitudinal center line of the vehicle 10.

The headlamp tester 14 is rolled into position directly in front of the headlamp 11 with the pointer 34a contacting the lens 12 at the center thereof and preferably in alignment with the light bulb center line. The telescope 62 is aligned with the aforementioned reference plane which includes the aiming line C. This is accomplished by sliding the rod 63 laterally in the tube 65, and by pivoting the unit 16 angularly in a horizontal plane about the vertical pivot axis defined by pin 42 of the universal joint 40. The unit 16 can be adjusted in a vertical plane about pivot pin 43 to attain horizontal positioning by mounting a spirit level, not shown, on the unit 16 and manipulating the vertical adjusting screw 49 until the spirit level is centered. The longitudinal axis of the telescope 62 and the optical center line of the unit are disposed in fixed parallel relationship, as previously described. When the sighting device 62 is aligned with the line of sight C defined by the strings 76 and 77, the optical center line of the unit 16 is parallel with the longitudinal center line of the vehicle 10.

After the optical center line of the unit 16 is positioned parallel with the longitudinal center line of the vehicle, the unit 16 is further adjusted in both horizontal and vertical directions until the optical center line of the unit is preset to a position corresponding to the desired horizontal direction of the headlamp beam, which is indicated on the calibrated scale 54, and to the desired vertical direction of the beam, which is indicated on the vertical calibrated scale. The horizontal direction is usually a straight ahead or zero scale setting, while the desired vertical direction is generally an angular declination from the horizontal. Thus, the unit 16 is preset so that the optical center line of the unit is positioned in the direction desired for the projection of the headlamp beam. The headlamp 11 is lighted and the light beam is projected through the converging lens 31 onto the photometer 32, which contains a conventional photoelectric cell, not shown, and registers the light intensity emitted by the headlamp. Thereupon, the headlamp 11 is adjusted by an operator in horizontal and vertical directions until the maximum light intensity is registered by the photometer 32. When this occurs, the direction of the light beam emitted by the headlamp 11 is aligned with the optical center line of the unit 16 and the operator has adjusted the headlamp 11 so that the beam of light emitted thereby is cast in the proper direction with respect to the direction of travel of the vehicle. To test the other headlamp of the vehicle 10, the headlamp tester 14 and the aiming device 15 are positioned on the opposite side of the vehicle 10 and the headlamp is tested in the manner above described.

While the aiming device of the present invention has been described as being adapted for aligning a headlamp testing apparatus, it is to be understood that it can be employed for aligning other types of automotive servicing equipment.

It will be understood that modifications and variations of the embodiment of the invention disclosed herein may be resorted to without departing from the spirit of the invention and the scope of the appended claims.

Having thus described my invention, what I claim as new and desire to protect by Letters Patent is:

1. In a device for establishing a line of sight parallel to the longitudinal center line of a vehicle, a base member, a post supported by said base member, a laterally projected support member secured to said post, a contact arm carried by said support member and adapted to engage a portion of the vehicle in a plane parallel to the longitudinal center line of the vehicle, a cross bar secured to said post above said support member, a plurality of laterally projected arms carried in spaced relation by said bar, and a plumb line suspended from each of said arms, said plumb lines being arranged in a line parallel to said contact arm for establishing a line of sight parallel to the longitudinal center line of the vehicle.

2. In an apparatus for adjusting a headlamp of a vehicle while disposed in a fixed position, a support structure, a contact arm rigidly mounted on said support structure and having contact surfaces arranged to be positioned in leaning contact with a portion of the vehicle that is disposed in a vertical plane parallel to the longitudinal center line of the vehicle, a plurality of reference members carried by said support structure and arranged in a line parallel to said contact surfaces for establishing a line of sight parallel to the longitudinal center line of the vehicle, a platform spaced from said support structure in a direction longitudinally of the vehicle, a light intensity indicating unit adjustably mounted on said platform, and a sighting device mounted on said light intensity indicating unit having the longitudinal axis thereof parallel with the optical center line of said light intensity indicating unit so that alignment of said sighting device with said line of sight positions the optical center line of the light intensity indicating unit parallel to the longitudinal center line of the vehicle.

3. In an apparatus for adjusting a headlamp of a vehicle while disposed in a fixed position, a support structure, a contact arm rigidly mounted on said support structure and having contact surfaces arranged to be moved into leaning contact with a portion of the vehicle concurrently at two points disposed in a vertical plane parallel to the longitudinal center line of the vehicle, means carried by said support structure and arranged in a line parallel to said contact surfaces for establishing a line of sight parallel to the longitudinal center line of the vehicle, a platform spaced from said support structure in a direction longitudinally of the vehicle, a light intensity indicating unit adjustably mounted on said platform, and a sighting device mounted on said light intensity indicating unit and having the longitudinal axis thereof parallel with the longitudinal optical center line of said light intensity indicating unit so that alignment of said sighting device with said line of sight positions the optical center line of said light intensity indicating unit parallel to the longitudinal center line of the vehicle.

4. In an apparatus for adjusting a headlamp of a vehicle, a support structure adapted to be positioned on a flat surface, a contact arm mounted on said support structure and having contact surfaces arranged to contact a portion of the vehicle that is disposed in a vertical plane parallel to the longitudinal center line of the vehicle, a plurality of plumb lines suspended from said support structure in a line parallel to said contact surfaces for establishing a line of sight parallel to the longitudinal center line of the vehicle, a platform spaced from said support structure in a direction longitudinally of the vehicle, a light intensity indicating unit pivotally mounted on said platform, a tubular sighting device carried by said light intensity indicating unit and having the longitudinal axis thereof parallel with the optical center line of said light intensity indicating unit, and means mounting said sighting device on said light intensity indicating unit for lateral adjusting movement and including means maintaining the axis of said sighting device and the optical center line of said light intensity indicating unit is fixed parallel relation so that pivotal movement of said light intensity indicating unit and lateral movement of said sighting device, in aligning said sight device with said line of sight, position the optical center line of said light intensity indicating unit parallel to the longitudinal center line of the vehicle.

5. A device for establishing a line of sight parallel to the longitudinal center line of a vehicle comprising a manually portable target structure including a support base adapted to be independently disposed on a surface adjacent the vehicle, a support member mounted for pivoting movement on said base, a contact member carried by said support member and having contact surfaces arranged to be positioned in leaning engagement with a vehicle surface that is disposed in a vertical plane parallel to the longitudinal center line of the vehicle, and means establishing two spaced apart reference points carried by said support member and defining a reference line parallel to a plane passing through said contact surfaces for establishing a line of sight parallel to the longitudinal center line of the vehicle.

6. A device for establishing a line of sight parallel to the longitudinal center line of a vehicle comprising a support base adapted to be disposed on a surface adjacent the vehicle, a support member mounted for pivoting movement on said base, a contact member rigid with said support member and having a pair of contact surfaces arranged to be concurrently positioned in leaning contact with a vehicle surface that is disposed in a vertical plane parallel to the longitudinal center line of the vehicle, a pair of gravity responsive members carried by said support member and defining a reference line parallel to a plane passing through said contact surfaces for establishing a line of sight parallel to the longitudinal center line of a vehicle, a platform disposed in a position intersected by said reference line, a light intensity indicating unit adjustably mounted on said platform, and a sighting device mounted on said light intensity indicating unit having the longitudinal axis thereof parallel with the optical center line of said light intensity indicating unit so that alignment of said sighting device with said line of sight positions the optical center line of the light intensity indicating unit parallel to the longitudinal center line of the vehicle.

7. A manually portable target structure for establishing a line of sight parallel to the longitudinal center line of a vehicle, comprising a manually portable base member independently resting on a surface adjacent said vehicle, a contact member carried by said base member and adapted to lean against a portion of the vehicle that is disposed in a plane parallel to the longitudinal center line of the vehicle, and a plurality of reference members carried by said base member and projecting in a vertical plane parallel to a vertical plane passing through the outermost portion of said contact member for establishing a line of sight parallel to the longitudinal center line of the vehicle.

8. A manually portable target structure for establishing a line of sight parallel to the longitudinal center line of a vehicle, comprising a manually portable base member resting independently on a surface adjacent said vehicle, a post mounted on said base member for pivotal movement toward said vehicle and for rotation about a vertical axis, a contact member carried by said post and having surfaces adapted to lean against the outermost portion of a wheel of the vehicle, a support member carried by said post, and a plurality of plumb lines carried by said support member and arranged in a vertical plane parallel to said contact surfaces for establishing a line of sight parallel to the longitudinal center line of the vehicle.

References Cited in the file of this patent

UNITED STATES PATENTS

| | | |
|---|---|---|
| 651,024 | Thomas | June 5, 1900 |
| 2,061,326 | Morse | Nov. 17, 1936 |
| 2,097,310 | Sayles | Oct. 26, 1937 |
| 2,149,302 | MacMillan | Mar. 7, 1939 |
| 2,167,803 | Graham et al. | Aug. 1, 1939 |
| 2,314,559 | Schilling | Mar. 23, 1943 |
| 2,358,010 | Holmes | Sept. 12, 1944 |
| 2,552,116 | Rodeghiero | May 8, 1951 |
| 2,562,142 | Frazee | July 24, 1951 |
| 2,755,554 | MacMillan | July 24, 1956 |